United States Patent [19]

Krüsi

[11] Patent Number: 4,907,337

[45] Date of Patent: Mar. 13, 1990

[54] APPARATUS FOR MACHINING A WORKPIECE OF WOOD, IN PARTICULAR WOOD BEAMS

[76] Inventor: Fritz Krüsi, Dorf, CH-9105 Schönengrund, Switzerland

[21] Appl. No.: 116,081

[22] Filed: Nov. 3, 1987

[30] Foreign Application Priority Data

Nov. 4, 1986 [CH] Switzerland .................. 4354/86

[51] Int. Cl.[4] .................. B23Q 3/157; B23Q 3/00; B27C 9/02

[52] U.S. Cl. .................. 29/568; 29/26 A; 83/471.3; 83/409.1; 144/2 R; 144/379; 269/24; 269/111; 408/56; 409/211

[58] Field of Search .................. 29/568, 560, 26 A; 408/59, 56, 57, 69, 70, 20, 103, 1 R; 409/131, 201, 204, 206, 211, 216, 231, 233; 144/2 R, 379, 1 A, 1 R, 35 R, 103, 278 R; 269/24, 111, 155, 156; 83/461, 471.3, 477.2, 486.1, 409.1

[56] References Cited

U.S. PATENT DOCUMENTS

| | | | |
|---|---|---|---|
| 2,227,410 | 12/1940 | Johnson | 409/211 |
| 3,298,098 | 1/1967 | Gleisner, Jr. | 29/568 |
| 4,694,871 | 9/1987 | Jenkner | 408/26 |
| 4,708,547 | 11/1987 | Baron | 409/233 |

FOREIGN PATENT DOCUMENTS

| | | | |
|---|---|---|---|
| 104008 | 3/1984 | European Pat. Off. | 409/233 |
| 3234675 | 3/1984 | Fed. Rep. of Germany | 29/568 |
| 196103 | 11/1984 | Japan | 408/59 |
| 610618 | 6/1978 | U.S.S.R. | 409/201 |
| 880723 | 11/1981 | U.S.S.R. | 144/2 R |
| 2167325 | 5/1986 | United Kingdom | 29/568 |

*Primary Examiner*—Gil Weidenfeld
*Assistant Examiner*—Daniel W. Howell
*Attorney, Agent, or Firm*—William R. Hinds

[57] ABSTRACT

The drive means (3) is arranged directly on the tool (2) and can be moved together therewith about a plurality of axes (A, B, C and D). The drive means is provided with a tool holding means for automatically delivering or receiving tools in a tool magazine (5) which is arranged above the region of operation of the tool (2). In that way a plurality of tools can be operated with a single drive means, wherein the tool guidance, workpiece forward feed and interchange of tools can be fully automated and programmed.

4 Claims, 8 Drawing Sheets

APPARATUS FOR MACHINING A WORKPIECE OF WOOD, IN PARTICULAR WOOD BEAMS

The invention relates to an apparatus for machining a workpiece of wood, in particular wood beams.

For the rational machining of wood beams and joists, apparatuses are already known in which the beams, mounted on a roller stool, successively pass through various machining stations, a respective machining tool being arranged at each station. Thus the beams may be cut to length for example at a first station, milled at a second station and bored at a third station. The known apparatuses operate in a comparatively non-rational fashion as a great deal of time is required for setting up the machines and the individual working operations can be automated only to a very limited extent. However modern civil engineering with wood requires some machining operations in which automation would be desirable in order to reduce the overall costs involved. Thus, for example, for building a lattice structure or truss assembly, the ends of wood beams must be slotted and bored for receiving connecting elements.

An object of the present invention is therefore to provide an apparatus of the kind set forth in the opening part of this specification, with which workpieces of wood can be machined in a versatile manner in an extremely rational fashion, wherein the machining operations can be extensively pre-programmed.

Another object of the invention is in particular to provide a drive means which permits the tool to be fixed directly on the drive shaft without unnecessary transmission arrangements.

In accordance with the invention that object is achieved by an apparatus comprising a transport means for clamping and displacing the workpiece along a feed path, and at least one tool drivable by a drive means, wherein the drive means with the tool is arranged displaceably in a forward region of the feed path of the transport means, and is fixed to a cantilever arm which is displaceable in a plane transversely with respect to the forward feed direction of the transport means in vertical and horizontal directions, and the drive means is also rotatable about the axis of the arm and about an axis transversely with respect to the axis of the arm, the drive means has a tool holding means for selectively accommodating different tools, a tool magazine having a plurality of tools is arranged above the region of operation of the tool, and the drive means is displaceable into the tool magazine for receiving or delivering a tool.

As the tool, together with the drive means, can be moved in different axes in the forward feed region of the transport means, no troublesome transmission arrangements such as for example cardan shafts, chains and the like are required between the drive means and the tool. The drive means is itself provided with a tool holding means, which increases the options for operation of the tool. The tool magazine which is arranged directly over the region of operation of the tool permits rapid automatic interchange of the tools. After a given working operation is concluded, such as, for example, cutting the beam to length by means of a saw blade, the saw blade can be replaced by a drill within a few seconds so that the apparatus is ready for a fresh machining operation immediately, almost without any stoppage times. All the operating movements involved can be freely programmed so that even complicated machining shapes such as for example milled contours and the like are possible.

Particularly versatile and comprehensive machining modes are provided by the drive means being fixed to a cantilever arm which is displaceable in a plane transversely with respect to the direction of forward feed of the transport means in vertical and horizontal directions and by the drive means being also rotatable about the axis of the arm and about an axis transversely with respect to the axis of the arm. Together with suitable programming of the forward feed movement and with a corresponding number of tools in the tool magazine, almost any desired cutting machining operations can be carried out in that way.

The tools in the tool magazine may be changed in a particularly simple fashion if the tool magazine has a holding rack which is arranged substantially parallel to the cantilever arm, with tool holders arranged in a row, and if the holding rack is displaceable relative to the arm for receiving and delivering the tools. In that case, in the actual tool change operation, the drive means moves into a given zero or neutral position and actuates only the tool holding means. The tool is loaded and unloaded by displacement of the tool holders to which the individual tools are clamped fast.

The forward feed movement of the workpieces may be produced in a particularly advantageous manner if the transport means has at least one rail-mounted clamping carriage with a support surface for the workpiece, and the workpiece can be acted upon by a clamping force in the plane of the support surface and transversely with respect to that plane, by means of respective separate clamping means. The dual clamping option permits the workpieces to be positioned in the optimum fashion. In certain machining processes, it is also possible to operate with only one clamping means.

Machinability of the workpieces can be further facilitated if the workpiece can be acted upon, transversely to the plane of the support surface, by a clamping means having a clamping bar which can be pivoted open and whose pivot point lies on one side of the support surface. The clamping bar can thereby be activated only for positioning of the wood beams. The clamping bar is then pivoted open and the workpieces are only held by the second clamping means which clamps them in the plane of the support surface. By virtue of that arrangement the beams can be freely machined on their top over their entire length, even if the beams lie on a plurality of clamping carriages.

As the tools are fixed directly on the drive shaft of the drive means, the latter must be of a special design so as to permit automatic tool changing. That tool changing operation may be carried out in a quite particularly advantageous fashion if the drive means is an electric motor with rotor and stator and a drive shaft which is mounted in a casing, wherein the drive shaft is in the form of a hollow shaft which extends on both sides by way of the rotor and which is provided at one end with a receiving means for force-lockingly receiving a tool, and if arranged in the hollow shaft is a gripping means for retaining a tool in the receiving means. In that way the drive shaft performs a double function insofar as it not only provides the torque required for operation of the tool, but it also permits automatic interchange of the tools.

In per se known manner the receiving means comprises an entrainment disc which is disposed around an inside cone member for receiving a Morse taper member, the gripping means having a clamping claw which is fixed to a clamping rod and which can be actuated by axial displacement of the clamping rod in the hollow shaft. The clamping claw is thus disposed in the interior of the motor and may be easily opened by way of the clamping rod.

The clamping rod may be actuated in a particularly simple manner if a spring means is arranged at the end of the hollow shaft which is in opposite relationship to the receiving means, the spring means engaging the clamping rod and being adapted to bias the clamping rod in such a way that the clamping claw can be opened only against the spring force. The spring means increases the overall length of the motor only slightly in that manner and in addition may be easily disposed in the casing of the motor. The spring means may be operated in a particularly simple fashion if arranged on the casing is a pressure fluid cylinder whose piston is arranged coaxially with respect to the clamping rod and with which the clamping rod is displaceable against the force of the spring means in the hollow shaft. When the piston is in a non-loaded condition, the clamping rod is thus always biased by the spring means. The piston has to be briefly actuated only for the purposes of changing the tools, in order thereby to displace the clamping rod. That arrangement is particularly simple and reliable in operation. The parts which rotate with the drive shaft are reduced to a minimum.

The receiving means can be cleaned by means of compressed air in a particularly simple fashion by both the clamping rod and also the piston being provided with a coaxial bore, wherein the two bores communicate with each other when the piston is in a condition of pressing against the clamping rod, with the bore on the piston being connected to a compressed air source for blowing out the receiving means. That arrangement does not require any sealing action in respect of rotating components as in fact the compressed is only blown into the clamping rod when the drive shaft is stationary.

For the automatic tool change operation, the entrainment disc must be moved into a given position so that the entrainment pins or entrainment bars which are provided on the tool engage into the entrainment disc. The entrainment disc may be positioned in a particularly advantageous manner if it can be arrested by means of an arresting pin which is engageable into a recess in a predetermined position of the entrainment disc. When the arresting pin is in the engaged condition, that ensures that the receiving means receives the tools in the tool magazine in the correct position. The arresting pin is preferably disposed on a piston which is displaceable in a pressure fluid cylinder integrated into the motor casing. Actuation of the arresting pin can thus be remotely controlled in a particularly simple manner. A particularly smooth and careful arresting action can be achieved if the rest position of the entrainment disc can be detected by a sensor which is stationary relative to the entrainment disc, and if the arresting pin can be activated only when the rest position has been detected. In that situation, the procedure involved is particularly advantageously such that firstly the motor is decelerated until the sensor signals the rest position of the entrainment disc. The arresting pin is then pressed under a biasing force against the entrainment disc, irrespective of the position in which the entrainment disc is to be found. Finally the motor is further activated for a brief period until the arresting pin engages into the recess on the entrainment disc. Even when using heavy tools with a relatively high degree of inertia, that procedure does not result in excessive loadings on the entrainment disc and the arresting pin.

An embodiment of the invention is described in greater detail hereinafter and illustrated in the drawings in which.

Figure 1:
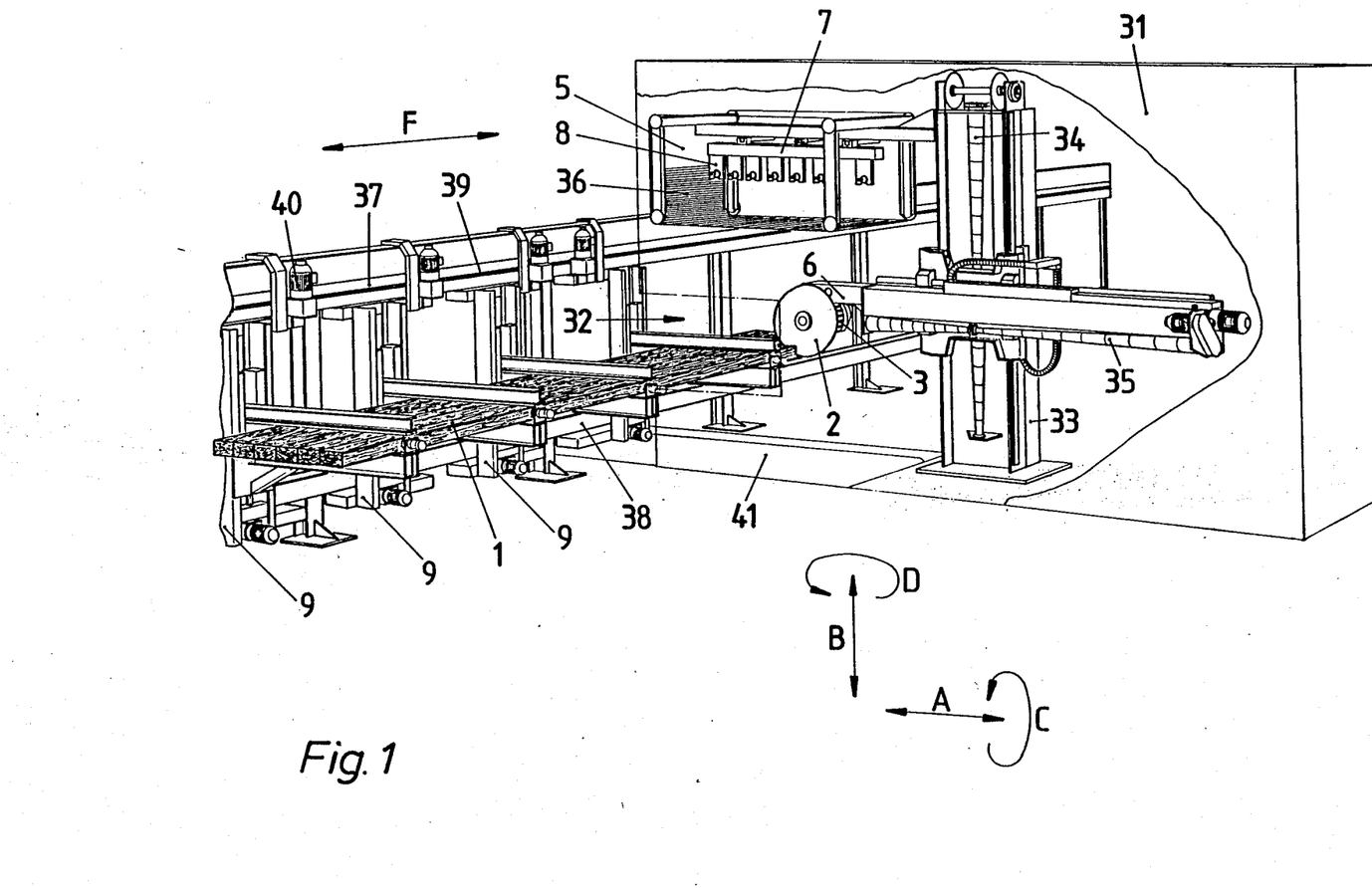
FIG. 1 is a perspective view of an apparatus according to the invention.
Figure 2:
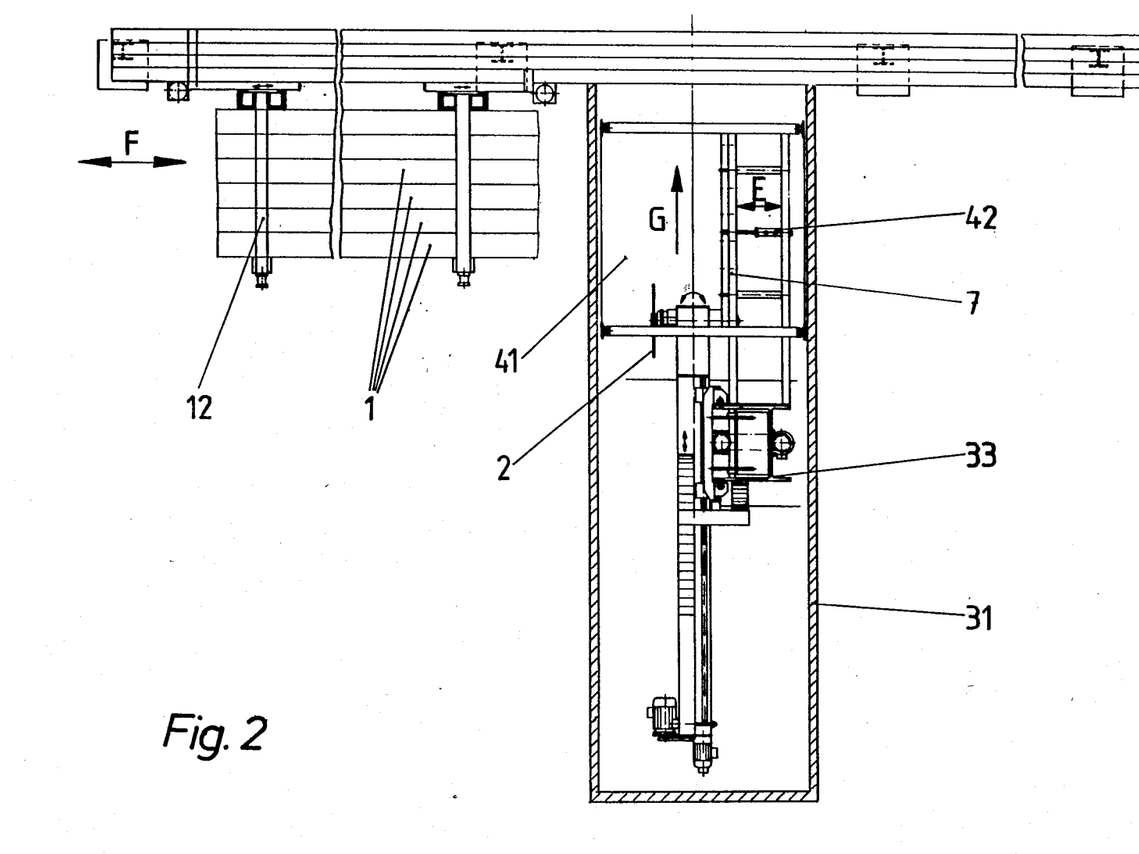
FIG. 2 is a plan view of the apparatus of FIG. 1.

As shown in particular in FIGS. 1 and 2, a plurality of wood beams 1 are clamped on individual clamping carriages 9. The clamping carriages are displaceable along an upper rail 37 and a lower rail 38 in the direction indicated by the arrow F. The actual machining center is disposed in a protective housing 31 which is shown in FIG. 1 in a partly cut-away form and in entirely cut-away form in FIG. 2.

An opening 32 is provided in the housing 31 on both sides so that the clamping carriages 9 can be passed through the protective housing 31. The two rails 37 and 38 extend over approximately the same length on both sides of the protective housing 31 so that it is possible to operate on alternate sides. While the beams are being fed to the tool from one side, a new layer of beams can be laid on to and positioned on the clamping carriages on the opposite side. That means that there are practically no stoppage times involved in loading the machine.

The tool itself is secured directly to a drive means 3 which will be described in greater detail hereinafter. The drive means is fixed to a cantilever arm 6 which is horizontally displaceable in the direction indicated by the arrow A. In the vertical direction, the entire arm 6 can be displaced in the direction indicated by the arrow B on a stand 33 so that the tool 2 can reach any desired coordinates in a plane transversely with respect to the direction of forward feed movement as indicated at F, within a given area. A vertical spindle 34 and a horizontal spindle 35 are provided for displacing the arm 6 in the two directions of movement. The two spindles are surrounded by a telescopically compressible sheathing to protect them from fouling. The two spindles 34 and 35 can be precisely rotated to fractions of a revolution by means of electric motors, the control devices required for that purpose being known to the man skilled in the art.

The drive means 3, together with the tool 2, may also be rotated in the direction indicated by the arrow C about the horizontal axis of movement of the arm 6 and in addition in the direction indicated by the arrow D about an axis which is transverse with respect to that axis of motion. In that way a tool 2 can be moved practically into any desired inclined position transversely with respect to the plane of movement of the arm 6. It will be apreciated that, in the case of certain machining operations, for example in an inclined cutting operation, the movement of the tool 2 is to be co-ordinated with the forward feed movement of the clamping carriages 9, but that can be readily achieved by a suitable control arrangement, by way of a computer.

A tool magazine 5 is arranged above the region of operation of the tool 2. The tool magazine 5 includes a holding rack 7 with individual tool holders 8. The tool holders are provided with clamps into which the tools can be engaged by means of their tool shank. The holding rack 7 is displaceable by means of a pressure fluid cylinder 42 in the direction indicated by the arrow E, that is to say relative to the plane of motion of the arm 6. In order to protect the tool magazine 5 from wood dust and chips in a machining operation, a curtain 36 extends at least over the lower side of the tool magazine. The curtain 36 is preferably in the form of a roller blind which can be rapidly displaced with a drive means. The operation of changing a tool in the tool magazine 5 takes place in the following fashion: as soon as a machining operation with a given tool is concluded, the drive means 3 is automatically moved into a given loading position. In that loading position the tool 2 is disposed with its shank in the same plane as the holding rack 7. The tool 2 is now moved into a position beneath that tool holder 8 to which the corresponding tool belongs and which is now empty. The curtain is opened and the arm 6 is raised in the direction indicated by the arrow B until the tool shank engages into the corresponding tool holder. The tool holding device in the drive means is now released so that the shank of the tool is freed. The entire holding rack with the tool which has just been used can now be moved back in the direction indicated by the arrow E. That is necessary in order to give the arm 6 the necessary freedom of motion in the direction indicated by the arrow A so that it can be moved into a position in which the axis of the drive means is coaxial with the axis of the tool which is to be freshly picked up in the holding rack 7. The holding rack 7 is now again moved towards the arm 6 in the direction indicated by the arrow E until the tool which is to be freshly picked up engages into the tool holding device on the drive means 3. The arm 6 can now be moved downwardly in the direction indicated by B, with the freshly picked-up tool being released from the tool holder 8 thereof. Directly after leaving the tool magazine 5, the curtain 36 is closed again.

Arranged on the ground in the protective housing 31 beneath the region of operation of the tool 2 is a conveyor belt 41 on which wood waste is transported away. A discharge arrangement for sucking away wood dust and smaller particles of wood is preferably also disposed in the interior of the protective housing 31, as is already the usual practice in conventional wood machining machines.

Figure 3:
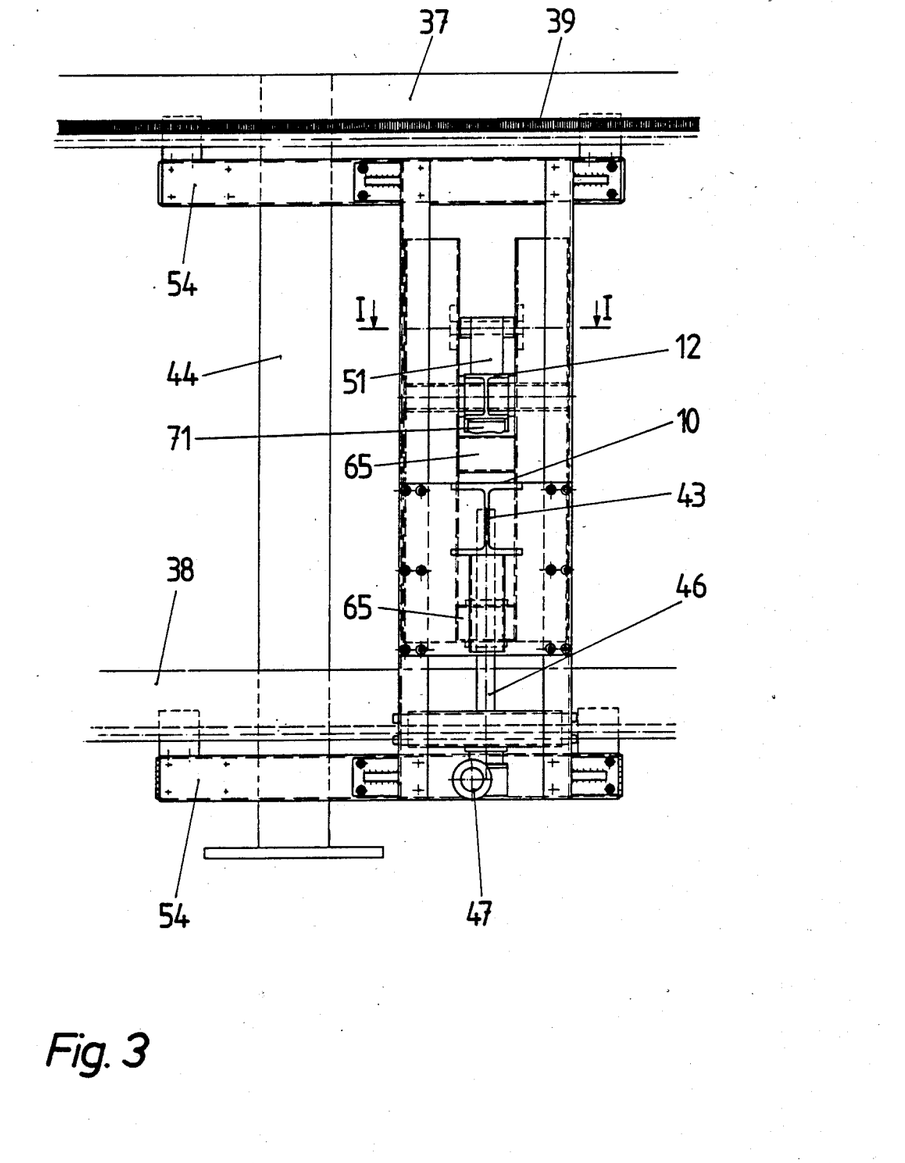
FIG. 3 is a front view of a single clamping carriage.
Figure 4:
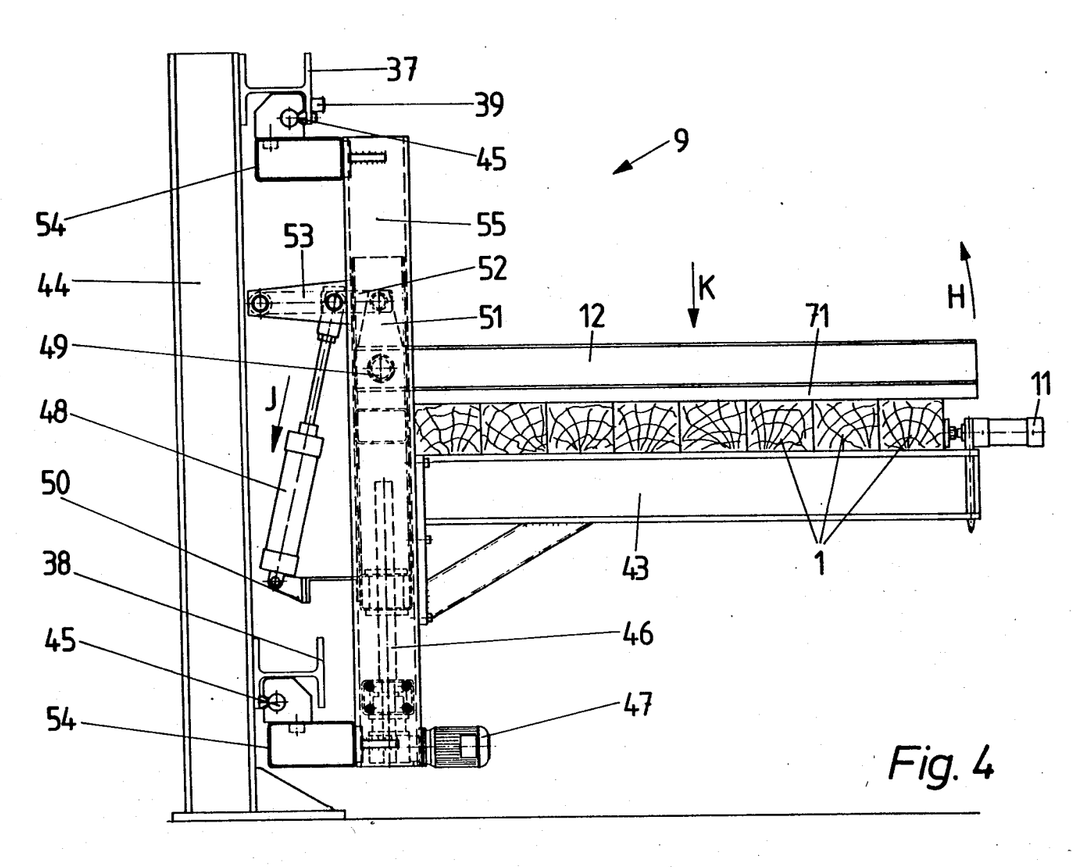
FIG. 4 is a side view of the clamping carriage shown in FIG. 3.
Figure 5:
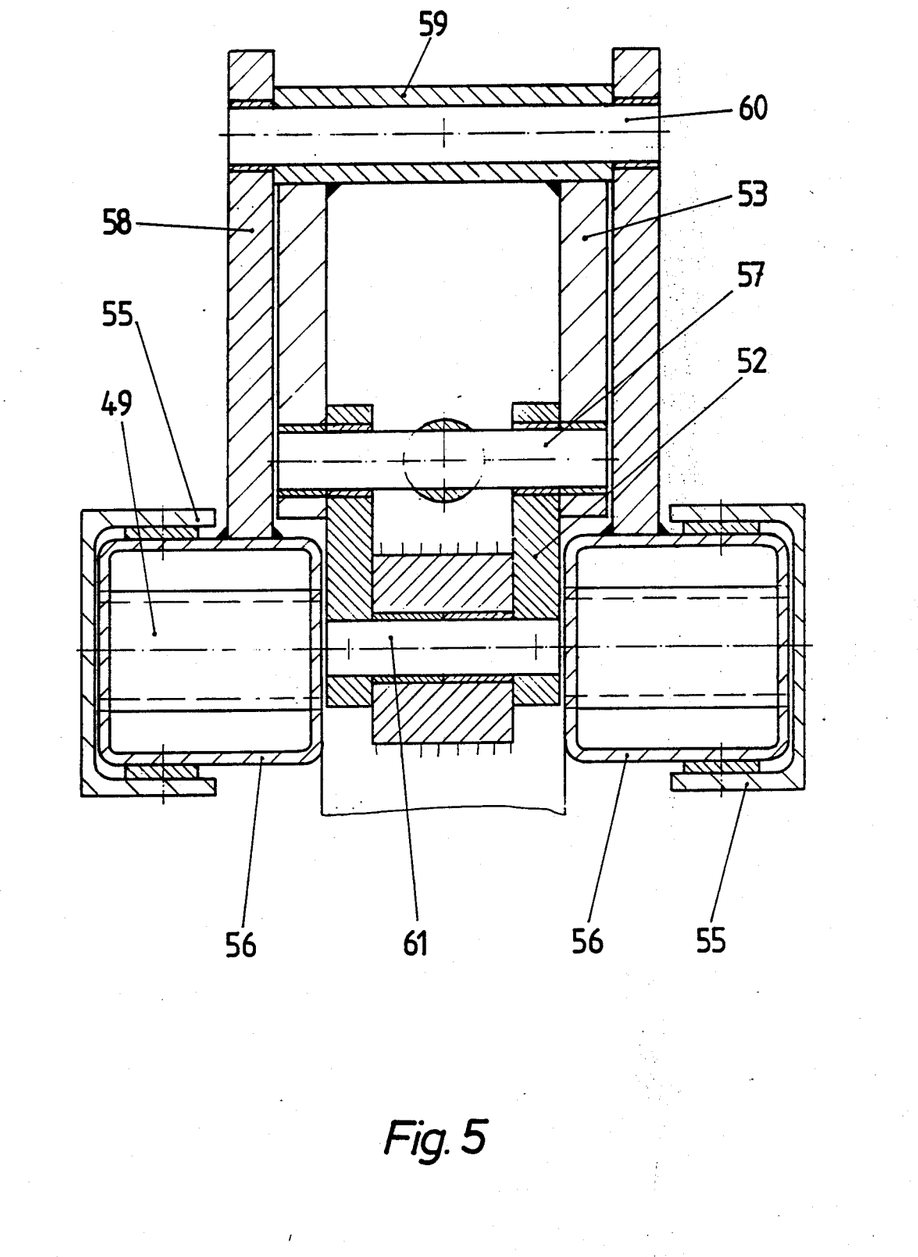
FIG. 5 is a view in cross-section on the plane I—I in FIG. 3.

The construction and the mode of operation of the individual clamping carriages 9 will now be described with reference to FIGS. 3 to 5. As already mentioned above, the carriages 9 can be displaced along an upper rail 37 and a lower rail 38 which in the present case are in the form of a double-T-beam. The two rails are carried by vertical supports 44 which are arranged at regular spacings. It will be appreciated however that another rail construction would also be possible. Thus for example two rails on which the carriages 9 are displaceable could also be arranged on the ground. However the illustrated construction has the advantage that no structural arrangements whatever are required on the ground and the surface beneath the wood beams 1 carried on the carriages remains fully accessible so that for example a fork lift truck can move into the region of movement of the carriages 9.

The wood beams 1 to be machined lie on a horizontal carrier 43 which forms a support surface 10. The carrier is secured to two mutually facing U-shaped members 55 which extend in parallel relationship in a vertical direction. The members 55 are in turn secured at their ends to horizontal rectangular members 54 which carry the rail mountings 45. Arranged at the outer free end of the carrier 43 is a clamping means 11 with which the wood beams 1 can be clamped in the horizontal direction. The clamping means 11 can be engaged into bores which are arranged at certain spacings over the entire length of the carrier 43. In that way it is possible to take account of the width of the bundle of beams or it is even possible for a plurality of clamping devices to be fitted on a carrier.

The two U-shaped members 55 serve at the same time as mountings for a pair of sliding members 56 which are displaceable in the Ushaped members in a vertical direction. The pair of sliding members 56 are connected together by vertical connecting members 65, the lower one of which is mounted in a lift spindle 46. The spindle 46 can be driven by means of a lift motor 47 so that the entire unit consisting of the members 56 and the connecting members 65 is adjustable in respect of height in the U-shaped members 55.

A clamping beam or bar 12 is mounted pivotably about a pivot axis 49 in the upper region of the slide members 56. A crank lever 51 is arranged at a right angle to the clamping bar 12. The lever 51 can be actuated by way of a special link mechanism by means of a hydraulic cylinder 48 which is pivotally carried on a support 50 on the lower connecting member 65. The link mechanism is shown in greater detail in particular in FIG. 5. It comprises a short link member 52 and a long link member 53 which are connected together at the shaft 57. The piston rod of the hydraulic cylinder 48 also pivotally engages the shaft 57. The short link member 52 is connected to the free end of the crank lever 51 at the pivot shaft 61. The long link member 53 is pivotally connected to a support 58 at the pivot shaft 60. The support 58 is in turn secured to the pair of slide members 56.

It will be seen that, for pivoting the clamping bar 12 upwardly in the direction indicated by the arrow H, the hydraulic cylinder 48 must be activated in such a way that the piston rod thereof is moved in the direction indicated by the arrow J. The link members 52 and 53 which are disposed in one plane fold in downwardly and the pivot shaft 57 rotates about the stationary pivot shaft 60 on the support 58. The carrier 43 is preferably fitted with the wood beams 1 when the clamping bar 12 is pivoted upwardly. The wood beams 1 are partially distorted or warped and must therefore be subjected by a suitable clamping means to a pressing force acting in the vertical direction. For that purpose the hydraulic cylinder 48 is activated in the opposite direction until it in turn occupies the horizontal position shown. In that case the two link members 52 and 53 and in particular the pivot axes 60, 57 and 61 thereof also lie in a horizontal plane. The motor 47 is now operated so that the clamping bar 12 which is fixed to the slide members 46, together with the hydraulic cylinder 48, moves downwardly in the direction indicated by the arrow K on the spindle 46 until the clamping bar bears against the wood beams. In that position, for the purposes of applying the actual clamping force, a hose 71 is pumped up with pressure fluid, being arranged on the underside of the clamping bar 12 and extending over the entire length thereof. In that way the beams 1 are pressed against the support surface 10 of the carrier 43. It will be appreciated that the vertical pressing force could also be applied in some other fashion. The particular advantage of the described link arrangement is that the torque which occurs at the free end of the crank lever 51 is not transmitted to the hydraulic cylinder 48 but to the support 58. Only a comparatively low pressure is required at the hydraulic cylinder 48 to hold the two link members 52 and 53 in the horizontal position. In that way the hydraulic cylinder 48 is not loaded even in the event of high pressing forces on the clamping bar 12. There also cannot be any spring action caused by compressibility of the pressure medium.

Depending on the way in which the wood beams 1 are to be machined, the clamping bar 12 can be pivoted upwardly again after the pressing operation so that the wood beams 1 are only clamped and retained in position in a horizontal direction by the clamping means 11. As a result of that, the entire top side of the wood beams 1 remains free for a machining operation. The clamping carriages 9 are displaced along a rack 39 on the upper rail 37 by means of a motor (not shown).

Figure 6:
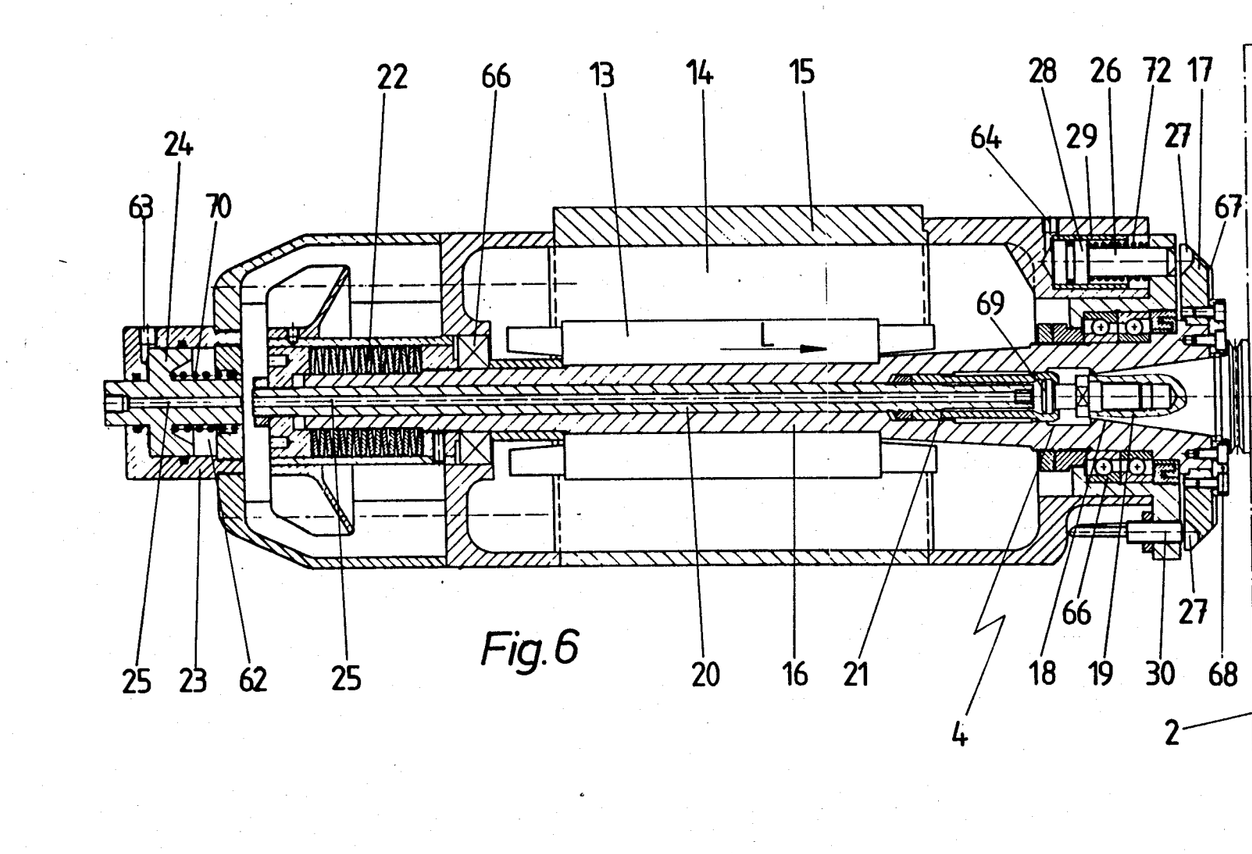
FIG. 6 is a view in cross-section through a drive means.

The drive means for the tool 2 is shown in greater detail in FIG. 6. It essentially comprises a squirrel-cage rotor electric motor comprising a rotor 13 disposed in a casing 15, with a starter 14. The rotor and the stator are of a relatively slender elongate configuration in order to minimise the diameter of the motor to the greatest possible extent. it will be seen that, the smaller the overall motor diameter, the greater is the useful depth of a tool, for example a circular saw blade. The drive shaft of the motor is in the form of a hollow shaft which is mounted in the casing 15 in rolling bearings 66. The hollow shaft 16 is provided at one end with a tool holding means 4 which force-lockingly holds the tool 2. With the high speeds of rotation required on wood machining machines, there is no need for a special transmission stage. The speed of rotation of the motor can be regulated by way of its frequency, in per se known manner.

Figure 8:
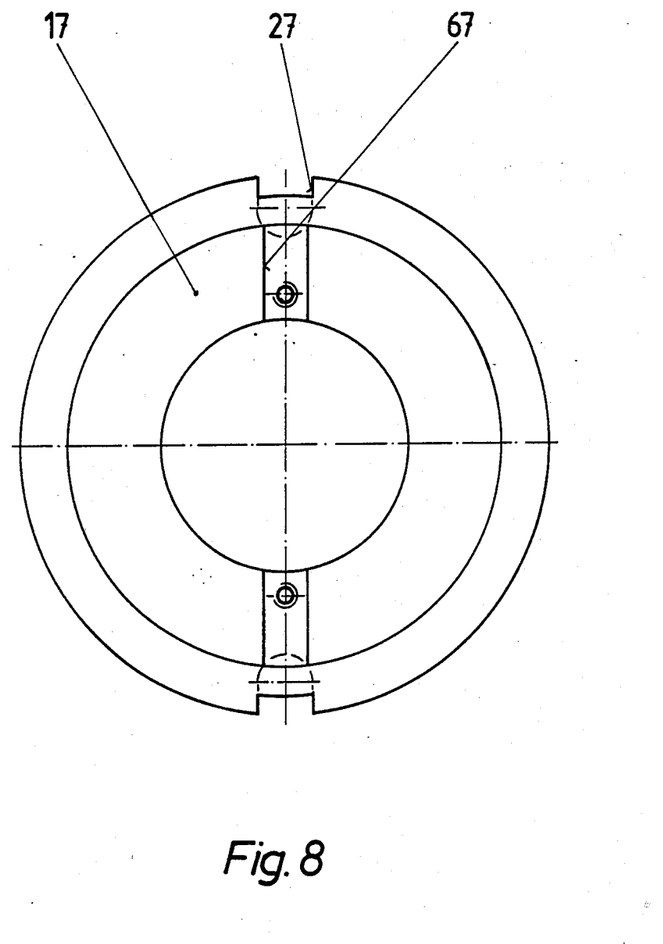
FIG. 8 is a plan view of an entrainment disc.

The tool holding means 4 essentially comprises an entrainment disc 17 and an inside cone member 18. The wood machining tools have a steep taper member 19 with diametrally oppositely disposed entrainment grooves which are arranged at given standard dimensions. The taper member 19 fits positively into the inside cone member 18 and the diametrally oppositely disposed keys 68 which are fixed to the entrainment disc 17 and the hollow shaft 16 respectively engage into the entrainment grooves in the taper member 19. The two keys 68 lie in the key tracks 67 and are screwed fast in position therein, as can be seen from FIG. 8 which only shows the key tracks with the screwthreaded bore. Screwed into the taper member 19 is a clamping pin 69 on which the taper member 19 can be pulled into and retained in the inside cone member 18.

A clamping rod 20 is axially displaceably mounted in the hollow shaft 16. Fixed to one end of the clamping rod 20 is a clamping claw 21 which is radially biased in such a way that it opens as soon as the clamping rod 20 is moved in the direction indicated by the arrow L towards the inside cone member. When the taper cone 19 is fitted, the clamping claw can engage the clamping pin 69 in that way. When the clamping rod 20 is actuated in the opposite direction, the clamping claw closes and pulls the taper member 19 into the inside cone member 18.

For the purposes of clamping the clamping rod 20, the arrangement has a spring assembly 22 which is arranged at one end of the hollow shaft 16 and which engages the clamping rod 20. The spring assembly 22 comprises a sandwich-like assembly of diaphragm springs and is so dimensioned that the tool 2 cannot come loose from the tool holding means 4 even when high axial forces are involved.

Figure 7:
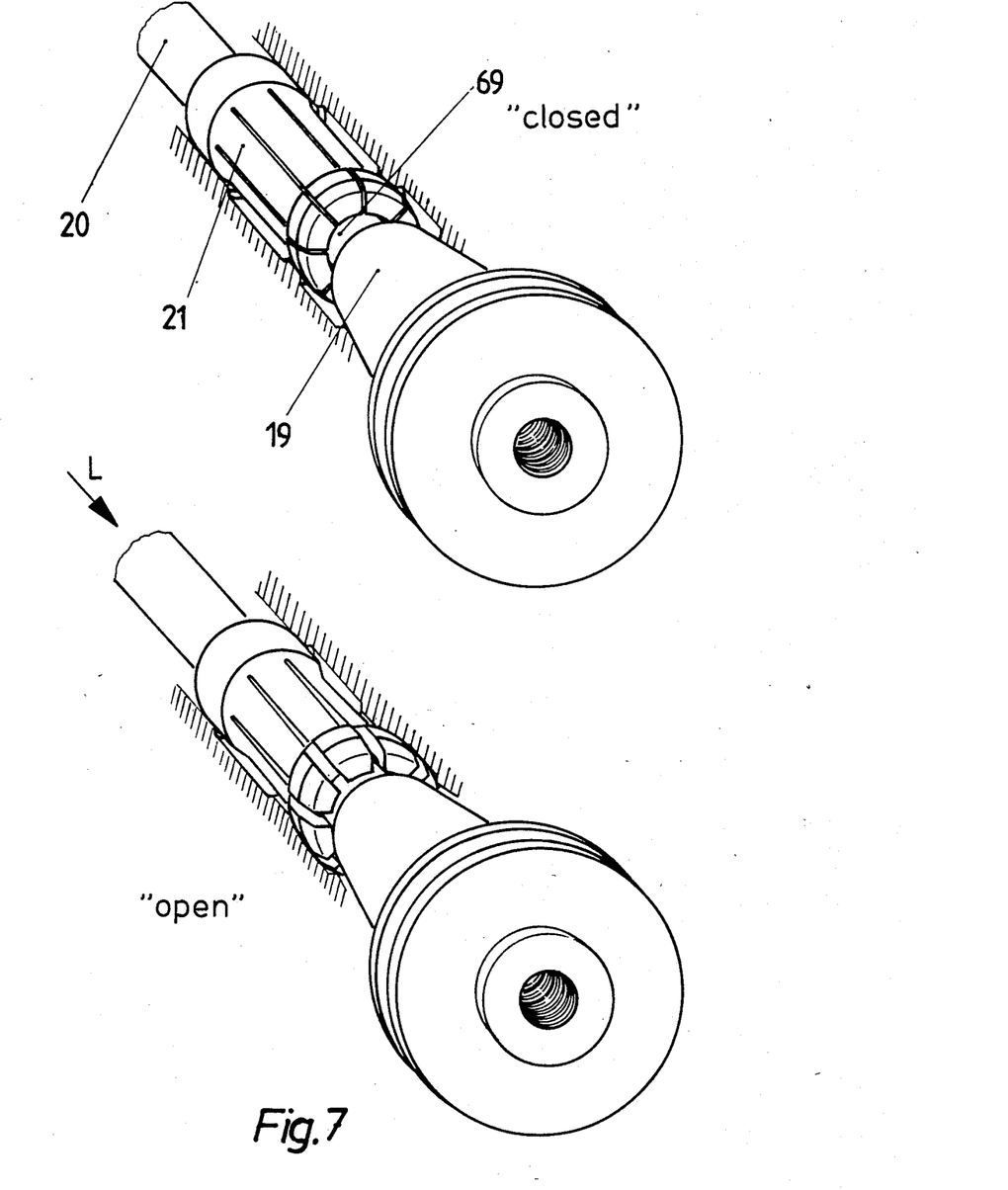
FIG. 7 is a perspective view of the gripping means in the opened and the closed positions.

For the purposes of opening the clamping claw 21 or for displacing the clamping rod 20 in the direction indicated by the arrow L, the arrangement has a piston 24 arranged coaxially with the clamping rod 20 in a pressure fluid cylinder 23. The cylinder 23 has a pressure fluid connection 63 on one side and the piston 24 is biased by a spring 70 so that in the non-loaded condition it occupies the position shown in the drawing. In that position the piston 24 is not in contact with the clamping rod 20 so that the entire force of the spring assembly 22 acts on the clamping rod 20. If the tool 2 is to be removed from the tool holding means 4, the piston 24 is operated so that it displaces the clamping rod 20 in the direction indicated by the arrow L against the force of the spring assembly 22. When that happens the clamping claw 21 is opened and releases the clamping pin 69, as shown in FIG. 7.

Both the piston 24 and also the clamping rod 20 are provided with a coaxial bore 25, the bores communicating with each other when the piston 24 is pressed against the clamping rod 20. The bores 25 serve to blow out the tool holding means with compressed air in each tool change operation, and in that way to clean it of saw dust and the like.

For the purposes of automatic tool pick-up, the entrainment disc 17 must always be moved into the same position so that the entrainment keys 68 engage into the entrainment grooves in the taper member 19. That positioning operation is performed by means of an arresting pin 26 and a sensor 30, which are both arranged on the motor casing in the region in which the entrainment disc 17 moves. The arresting pin is fixed to a piston displaceable in a pressure fluid cylinder 29. The cylinder 29 is preferably integrated into the motor casing and is supplied by way of a pressure fluid connection 64. Preferably, that unit is a pneumatically operable piston which is also biased by means of a spring 72. In the non-loaded condition, as shown in the drawing, the arresting pin 26 is retracted so that the entrainment disc can rotate freely. The sensor 30 serves to sense stopping or rotation of the entrainment disc or a quite specific position thereof. The entrainment disc 17 can be arrested by the arresting pin at recesses 27 which in the present embodiment also serve for signal formation purposes for the sensor 30. The sensor 30 is an electromagnetic probe which detects whether a recess 27 is or is not to be found in the region of the probe. It will be appreciated that the sensor 30 could also be an optical probe which senses a light-dark code on the entrainment disc 17.

In the above-mentioned operation of automatically changing a tool, the following procedure takes place in the drive means: the motor is decelerated until the sensor 30 signals that the entrainment disc 17 is stopped. In that case the entrainment disc 17 remains stationary in any position so that the sensor 30 signals either only dark or metal or only light or non-metal. After the entrainment disc has been detected as being stopped, the pneumatic piston 28 is operated so that the arresting pin 26 is pressed against the entrainment disc 17 by a biasing force. If the recess 27 is by chance precisely in the right position, the arresting pin 26 engages thereinto and no further positioning step is then required. If however one of the two recesses 27 is not aligned with the arresting pin, the motor is briefly operated again until the sensor 30 signals a recess 27. The biased arresting pin 26 now immediately engages into the oppositely disposed recess so that the entrainment disc 17 cannot be rotated any further.

After the operation of positioning the entrainment disc has been carried out, the piston 24 is operated in the above-indicated manner so that the clamping claw 21 opens. When that happens, at the same time compressed air is blown into the tool holding means by way of the bores 25. The tool with its taper member 19 can now be removed from the inside cone member 18. A fresh tool is then inserted into the tool holding means 4, the entrainment grooves thereof being disposed in precisely the same position as the tool which has just been removed. The pressure fluid cylinder 23 is now relieved so that the clamping rod 20 is in turn subjected to the force of the spring assembly 22 and the clamping claw 21 closes. At the same time the feed of compressed air for blowing out the total holding means is cut off. The pneumatic cylinder 29 is then relieved so that the arresting pin 26 is urged out of the recess 27 by the spring 72. The drive means is now ready for operation again. It will be seen that the extremely slender and short design configuration of the drive means provides a large region of operation in respect of the tool 2. That concerns on the one hand the depth of cut of the tool and on the other hand the rotatability of the drive means in the directions indicated by the arrows C and D in FIG. 1, with the shortest possible radius.

I claim:

1. Apparatus for machining a workpiece of wood, in particular wood beams, comprising a transport means for clamping and displacing the workpiece along a feed path, and at least one tool drivable by a drive means, wherein the drive means with the tool is arranged displaceably in a forward region of the feed path of the transport means, and is fixed to a cantilever arm which is displaceable in a plane transversely with respect to the forward feed direction of the transport means in vertical and horizontal directions, and the drive means is also rotatable about the axis of the arm and about an axis transverse with respect to the axis of the arm, means are provided for displacing said cantilever arm in said vertical and horizontal directions and for rotating said drive means about said axis, the drive means has a tool holding means for selectively accommodating different tools, a tool magazine having a plurality of tools is arranged above the region of operation of the tool, and the drive means is displaceable into the tool magazine for receiving or delivering a tool.

2. Apparatus according to claim 1 characterised in that the tool magazine (5) has a holding rack (7) arranged substantially parallel to the cantilever arm, with tool holders (8) arranged in a row, that the holding rack (7) is displaceable relative to the arm (6) for receiving and delivering the tools, and that means are provided for so displacing the holding rack.

3. Apparatus according to claim 1 characterised in that the transport means has at least one rail-mounted clamping carriage (9) with a support surface (10) for the workpiece (1) and that two separate clamping means are provided such that the workpiece can be acted upon by a clamping force in the plane of the support surface by one of said clamping means and transvnersely with respect to that plane by the other of said clamping means (11, 71).

4. Apparatus according to claim 4 characterised in that the workpiece (1) can be acted upon transversely with respect to the plane of the support surface (10) by said other of said clamping means having a clamping beam (12) which can be pivoted open and whose pivot point (49) lies on one side of the support surface, and including means for so pivoting said clamping beam.

* * * * *